(12) United States Patent
Frick

(10) Patent No.: US 6,508,131 B2
(45) Date of Patent: Jan. 21, 2003

(54) PROCESS SENSOR MODULE HAVING A SINGLE UNGROUNDED INPUT/OUTPUT CONDUCTOR

(75) Inventor: Roger L. Frick, Hackensack, MN (US)

(73) Assignee: Rosemount Inc., Eden Prairie, MN (US)

( * ) Notice: Subject to any disclaimer, the term of this patent is extended or adjusted under 35 U.S.C. 154(b) by 42 days.

(21) Appl. No.: 09/862,186

(22) Filed: May 21, 2001

(65) Prior Publication Data

US 2002/0011115 A1 Jan. 31, 2002

Related U.S. Application Data

(63) Continuation-in-part of application No. 09/312,411, filed on May 14, 1999, now Pat. No. 6,295,875.

(51) Int. Cl.$^7$ ................................................ G01L 7/00
(52) U.S. Cl. ............................................................. 73/756
(58) Field of Search .................. 73/706, 708, 715–728, 73/756; 361/283.1, 283.2, 283.3, 283.4

(56) References Cited

U.S. PATENT DOCUMENTS

| 4,422,335 | A | 12/1983 | Ohnesorge et al. ........... 73/724 |
| 4,434,451 | A | 2/1984 | Delatorre .................... 361/283 |
| 4,455,874 | A | 6/1984 | Paros ........................... 73/704 |
| 4,458,537 | A | 7/1984 | Bell et al. .................... 73/718 |
| 4,490,773 | A | 12/1984 | Moffatt ....................... 361/283 |
| 4,542,436 | A | 9/1985 | Carusillo .................... 361/283 |
| 4,562,742 | A | 1/1986 | Bell ............................ 73/718 |
| 4,670,733 | A | 6/1987 | Bell ............................ 338/36 |
| 4,785,669 | A | 11/1988 | Benson et al. ................ 73/718 |
| 4,860,232 | A | 8/1989 | Lee et al. ............... 364/571.04 |
| 4,875,369 | A | 10/1989 | Delatorre .................... 73/151 |
| 4,878,012 | A | 10/1989 | Schulte et al. ................ 324/60 |
| 4,926,674 | A | 5/1990 | Fossum et al. .................. 73/4 |
| 4,951,174 | A | 8/1990 | Grantham et al. ........ 361/283.1 |
| 4,977,480 | A | 12/1990 | Nishihara .................... 73/724 |
| 5,094,109 | A | 3/1992 | Dean et al. ................... 73/718 |
| 5,168,419 | A | 12/1992 | Delatorre .................... 361/283 |
| 5,194,819 | A | 3/1993 | Briefer ........................ 73/718 |
| 5,230,250 | A | 7/1993 | Delatorre .................... 73/733 |
| 5,233,875 | A | 8/1993 | Obermeier et al. ........... 73/718 |
| 5,329,818 | A | 7/1994 | Frick et al. ................... 73/708 |
| 5,492,016 | A | 2/1996 | Pinto et al. ................... 73/724 |
| 5,542,300 | A | 8/1996 | Lee ............................. 73/724 |
| 5,637,802 | A | 6/1997 | Frick et al. ................... 73/724 |
| 5,642,301 | A | 6/1997 | Warrior et al. .......... 364/571.02 |
| 5,705,978 | A | 1/1998 | Frick et al. ................... 340/511 |
| 5,757,608 | A | 5/1998 | Bernot et al. ............. 361/283.4 |
| 5,911,162 | A | 6/1999 | Denner ........................ 73/718 |
| 5,992,240 | A | 11/1999 | Tsuruoka et al. .............. 73/718 |
| 6,236,096 | B1 | 5/2001 | Chang et al. ................. 257/419 |
| 6,295,875 | B1 | 10/2001 | Frick et al. ................... 73/718 |

Primary Examiner—William Oen
(74) Attorney, Agent, or Firm—Westman, Champlin & Kelly, P.A.

(57) ABSTRACT

A process sensor module includes a housing with a first fitting that rotatably mates with a corresponding fitting on a bus adapter module. Integrated circuitry in the housing includes a process sensor. A two conductor circuit energizes the integrated circuitry, communicates a sensed process variable to the bus adapter module and communicates data from the bus adapter module to the integrated circuitry. A rotatable coaxial electrical contact is sealed in the first fitting and connects the two conductor circuit to the bus adapter module.

17 Claims, 11 Drawing Sheets

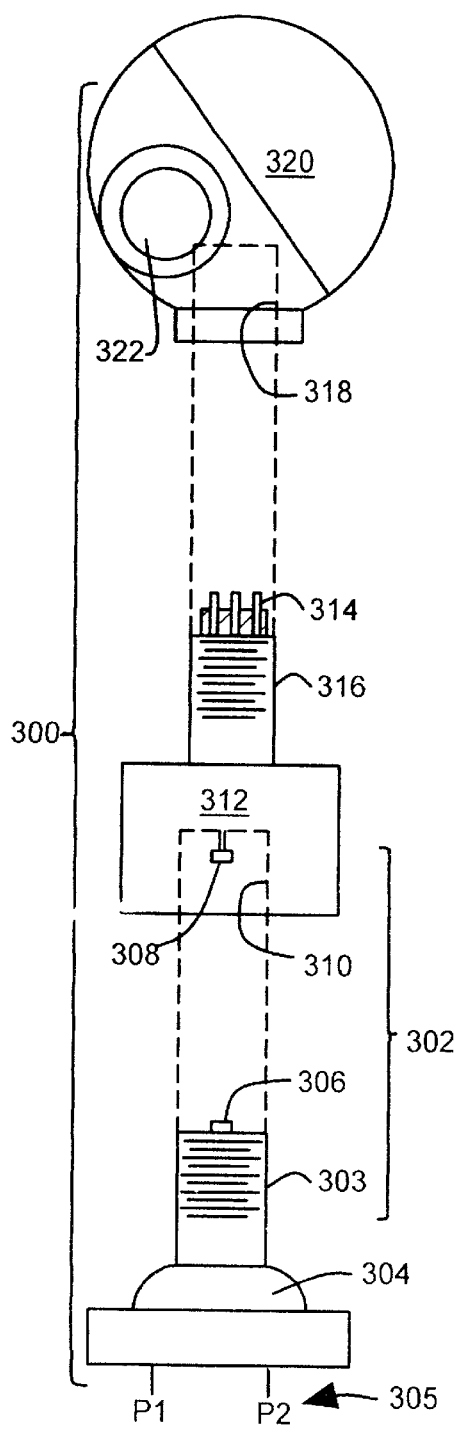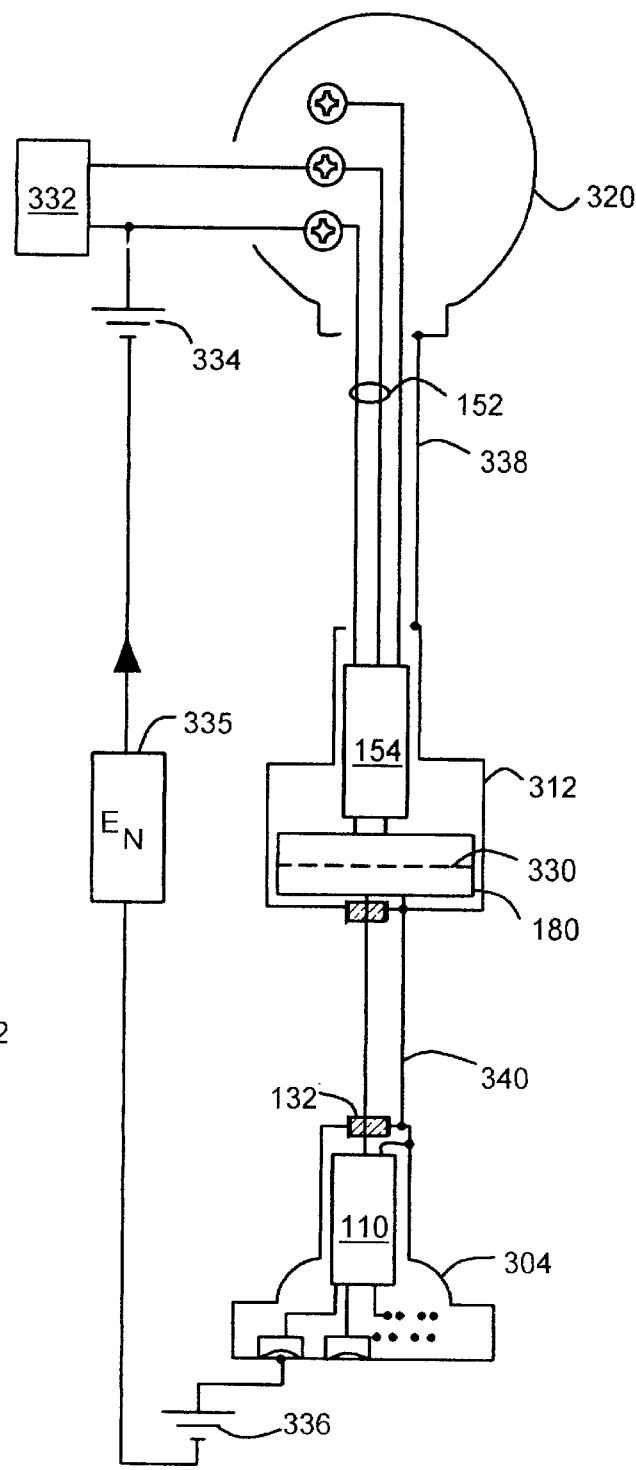
FIG. 9
FIG. 10

PROCESS SENSOR MODULE HAVING A SINGLE UNGROUNDED INPUT/OUTPUT CONDUCTOR

CROSS-REFERENCE TO RELATED APPLICATION

This is a continuation-in-part of Application Ser. No. 09/312,411 filed May 14, 1999 now U.S. Pat. No. 6,295,875 and titled "PROCESS PRESSURE MEASUREMENT DEVICES WITH IMPROVED ERROR COMPENSATION."

FIELD OF THE INVENTION

The present invention concerns fluid process transmitters used in industrial fluid processing plants. In particular, the present invention concerns process sensor modules used in process transmitters.

BACKGROUND OF THE INVENTION

In pressure transmitters, there are usually two separate housings that are assembled. One of the housings is a sensor module housing which has piping connections for pressure fittings, and includes the actual pressure sensor and a circuit board that has electronic components on it. The second housing is the electronics assembly housing that includes a circuit board having additional circuit components, and includes one or more threaded conduit hubs for connecting conduits carrying a communication bus to the pressure transmitter. A multiconductor cable passes through interior openings between the housings and connects the circuit boards.

Generally, the first (sensor) housing is rigidly mounted to the pressure fittings, and the second (electronics) housing is able to rotate relative to the first housing. This allows a conduit hub on the second housing to be conveniently connected to a conduit that carries the communication bus. One arrangement for providing this rotation ability is shown in U.S. Pat. No. 5,028,746 Petrich.

As more miniaturized integrated circuits that operate at lower voltages have become available, there is a desire to use them to reduce the size and power consumption of the sensor module. There is a problem, however, with the higher level signals and noise of the communication bus passing via the multiconductor cable into the lower power integrated circuits. The signal-to-noise ratios are degraded because of the reduced power or signal levels in the sensor electronics, and the lower level integrated circuits can't be used because of the noise.

Finding a solution to the noise problem is difficult. There are multiple conductors to be shielded or filtered. Also, a wider variety of noise scenarios are encountered as more communication bus protocols are introduced. Some communication busses have one lead grounded ("single-ended" lines) and some communication busses have neither lead grounded ("balanced" lines). Each communication protocol also has its own range of signal frequencies that each present different noise problems to be dealt with.

In other process transmitters, such as temperature, pH and flow transmitters, problems are encountered that are analogous to the problems described above with with respect to pressure transmitters.

Process transmitters are needed that are rotatably connectable to a wide variety of communication bus protocols and that avoid conducting excessive noise to the sensor module so that lower voltage level integrated circuits can be used in the sensor module.

SUMMARY OF THE INVENTION

A process sensor module includes a housing with a first fitting that rotatably mates with a corresponding fitting on a bus adapter module. Integrated circuitry in the housing includes a process sensor. A two conductor circuit energizes the integrated circuitry, communicates a sensed process variable to the bus adapter module and communicates data from the bus adapter module to the integrated circuitry. A rotatable coaxial electrical contact is sealed in the first fitting and connects the two conductor circuit to the bus adapter module.

BRIEF DESCRIPTION OF THE DRAWINGS

FIG. 9 illustrates an exploded view of a pressure transmitter with a rotatable coaxial electrical contact arrangement.

FIG. 10 illustrates circuit paths associated with the pressure transmitter of FIG. 9.

DETAILED DESCRIPTION

In the present invention, a process transmitter has a process sensor module that includes low power, noise-sensitive integrated circuitry that is connected by way of a rotatable coaxial electrical contact arrangement to a bus adapter module with higher power circuitry. The rotatable coaxial electrical contact arrangement connects a two conductor circuit between the sensor module and the bus adapter module. The bus adapter module and the process sensor module are each rotatable relative to one another while sliding parts in the contact arrangement maintain contact over a wide range of relative rotation. When a threaded connector arrangement is used, the threads do not need to be tightened to complete the electrical circuit. One of the conductors of the two conductor circuit is grounded, leaving only a single ungrounded conductor connecting between the two modules. The arrangement reduces noise transmission to the low power integrated circuitry and helps to isolate the low power integrated circuitry.

The coaxial connection is rotatable so that a conduit entry hub on the bus adapter module can be conveniently aligned with a conduit carrying the bus conductors to the transmitter. The ungrounded conductor makes a sliding contact that is engaged over a wide rotational range. The use of multiconductor ribbon cables between the modules is avoided and lower power integrated circuits can be used in the process sensor module.

In a preferred arrangement, an isolation transformer is also used to provide galvanic isolation for the two conductor circuit.

Figure 1:
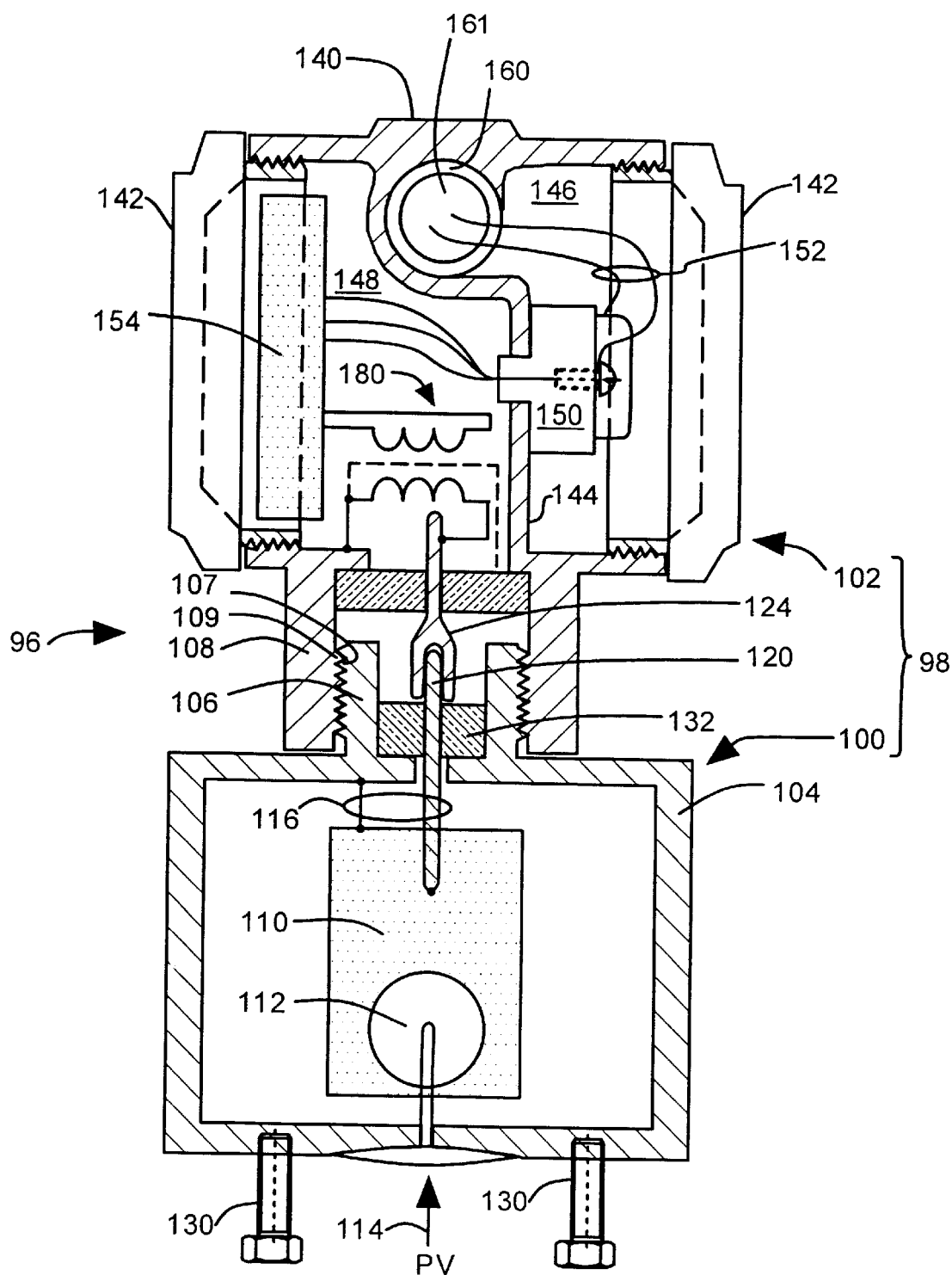
FIG. 1 illustrates a process transmitter with a rotatable coaxial electrical contact arrangement.

FIG. 1 illustrates a schematic cross-section of a first embodiment of a process transmitter 98 with a rotatable coaxial electrical contact arrangement at 96. The process transmitter 98 includes a process sensor module 100 and a bus adapter module 102 that are mechanically and electrically connected at the rotatable coaxial electrical contact arrangement at 96. The contact arrangement at 96 can be separated by the user, allowing for modular assembly of various sensor modules 100 with various bus adapter modules 102, depending on the needs of the application.

The process sensor module 100 has a housing 104 that includes a first fitting 106 with threads 107 that rotatably mate with a second fitting 108 on the bus adapter module 102. Second fitting 108 includes threads 109 that engage threads 107.

The process sensor module 100 includes integrated circuitry 110 that is enclosed in the housing 104. The integrated circuitry 110 includes a process sensor 112 adapted to sense a fluid process variable 114. Process sensor 112 is typically a pressure sensor sensing a fluid process variable 114 that is a pressure. Process sensor 112, however, can also be another type of sensor such as a temperature, pH, flow sensor or the like, with the housing 114 adapted accordingly. The process variable 114, which is typically a differential pressure, is supplied by impulse lines (not illustrated in FIG. 1) that are rigidly bolted to process sensor module 100 by bolts 130.

A two conductor circuit 116 electrically connects the integrated circuitry 110 to the metal housing 104 and a contact 120 in the rotatable coaxial electrical contact arrangement at 96. The metal housing 104 is preferably grounded by way of the process connection as well as connected to one of the conductors of the two conductor circuit 116. The metal housing 104 serves as a faraday shield.

The two conductor circuit 116 is a very low power circuit consistent with the needs of low power integrated circuitry 110. Voltage levels on the two conductor circuit 116 are typically 10 volts or less. Two conductor circuit 116 carries electrical currents over a very short distance inside the transmitter 98, typically less than 25 cm. The characteristics of the two conductor circuit 116 are thus much different than the characteristics of a two wire 4–20 mA industrial process control telemetry circuit that typically has voltages up to 50 volts and carries currents across distances of hundreds of meters.

Two conductor circuit 116 provides energization to the integrated circuitry 110. The two conductor circuit 116 communicates the sensed process variable to the bus adapter module 102. The two conductor circuit 116 also communicates data from the bus adapter module 102 to the integrated circuitry 110. With circuit 116, digital two-way communication signals can be superimposed on the energization current. Alternatively, digital communication signals from the bus adapter module 102 can be used to energize the integrated circuitry 110. Integrated circuitry 110 is explained in more detail below in connection with an example circuit illustrated in FIG. 19.

Coaxial electrical contact 120 is rotatable relative to contact 124 on bus adapter module 102. Contact 120 is sealed and fixed in the first fitting 106 by an electrically insulating ring 132 that is preferably glass. Contacts 120, 124, and threads 107, 109 electrically connect the two conductor circuit 116 to the bus adapter module 102. The two conductor circuit 116 and the rotatable coaxial electrical contact arrangement 96 provide noise isolation for the integrated circuitry 110 from noise that comes from field wiring 152 or that is generated by bus adapter circuit 154.

In one embodiment, bus adapter module 102 includes a metal housing 140 with two threaded removable covers 142. Housing 140 is a dual compartment housing with a wall 144 separating a field wiring compartment 146 from a bus adapter electronics compartment 148. A sealed terminal block 150 connects field wiring circuit 152 to bus adapter circuit 154. The bus adapter module 102 includes second coaxial electrical contact 124 disposed in the second fitting 108 and rotatably mating with the first coaxial electrical contact 120. The first and second coaxial electrical contacts 120, 124 are automatically mated when the first and second fittings 106, 108 are mated.

There is a sliding rotatable engagement of electrical contacts 120, 124. The contacts 120, 124 are mated over a rotation range of at least 720 degrees of rotation of the second fitting 108 on the first fitting 106.

At least one of the first and second electrical contacts 120, 124 is spring loaded to provide good electrical contact. Typically, the outer contact 124 is slotted and made of a spring metal to provide the needed contact to contact 120.

Bus adapter circuit 154 can be selected from a variety of types of bus adapter modules to match the protocol used on the field wiring circuit 152. Typically field wiring protocols on circuit 152 can include industrial field telemetry protocols such as the 4–20 mA loop, HART, Foundation Fieldbus, CAN, Profibus and the like. An example of bus adapter circuitry is illustrated in U.S. Pat. No. 5,764,891 Warrior.

Bus adapter module 102 includes an isolation transformer 180 that provides a galvanic barrier and noise isolation between one side of the transformer 180 connected to the bus adapter circuit 154 and the other side of the transformer 180 connected to the integrated circuitry 110 and the two conductor circuit 116. The transformer 180 has a first winding coupled to the two conductor circuit and a second winding coupled to the communication bus 152 via circuit 154. The transformer 180 preferably includes a galvanic isolation barrier between first winding and the second winding, and also preferably includes a grounded faraday shield between the windings.

The transformer 180 reduces noise transmission to the sensitive low power integrated circuitry 110. The integrated circuitry 110 includes integrated circuits that operate with supply voltage levels of less than ten volts.

In one embodiment, field wiring circuit 152 is routed into the transmitter 100 by an electrical conduit 160 that is connected at a threaded conduit entry 161 on housing 140. The arrangement of conduit 160 is illustrated in more detail below in connection with FIG. 2.

Figure 2:
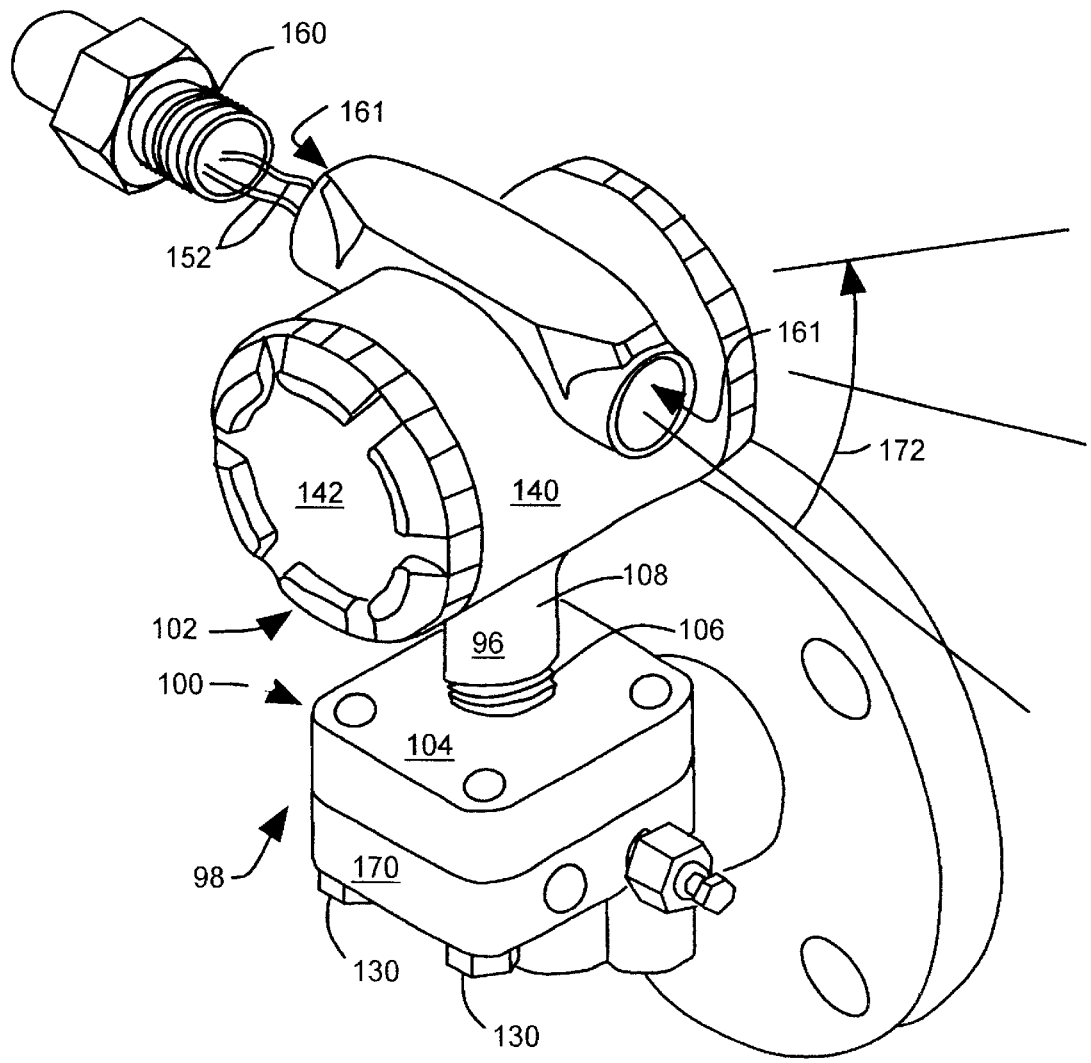
FIG. 2 illustrates a pressure transmitter with a sensor housing rigidly mounted to a tank flange and a bus adapter module that is rotatable relative to the sensor housing.

FIG. 2 illustrates a pressure transmitter 98 having a sensor module 100 that senses pressure and that is rigidly mounted to a tank flange 170, and also that also has a bus adapter module 102 that is rotatable relative to the sensor housing 104. Bus adapter module 102 can be rotated as illustrated by arrow 172 to align one of its two threaded conduit entries 161 with a threaded end of an electrical conduit 160.

The housing 104 is adapted for rigid mounting by bolts 130 to a process vessel such as a level flange 170. Rotating the second threaded fitting 108 relative to the first threaded fitting 106 rotationally varies the positions of the conduit hubs 161 on the bus adapter module 102. One of the conduit hubs 161 can thus be aligned easily with the conduit end 160 to complete field wiring connections.

A rotatable coaxial electrical contact arrangement like arrangement 96 illustrated in FIGS. 1–2 can be configured in a variety of ways, some of which are discussed below in connection with further examples illustrated in FIGS. 3–18.

Reference numerals used in FIGS. 3–18 that are the same as reference numerals used in FIGS. 1–2 refer to the same or similar features.

Figure 3:
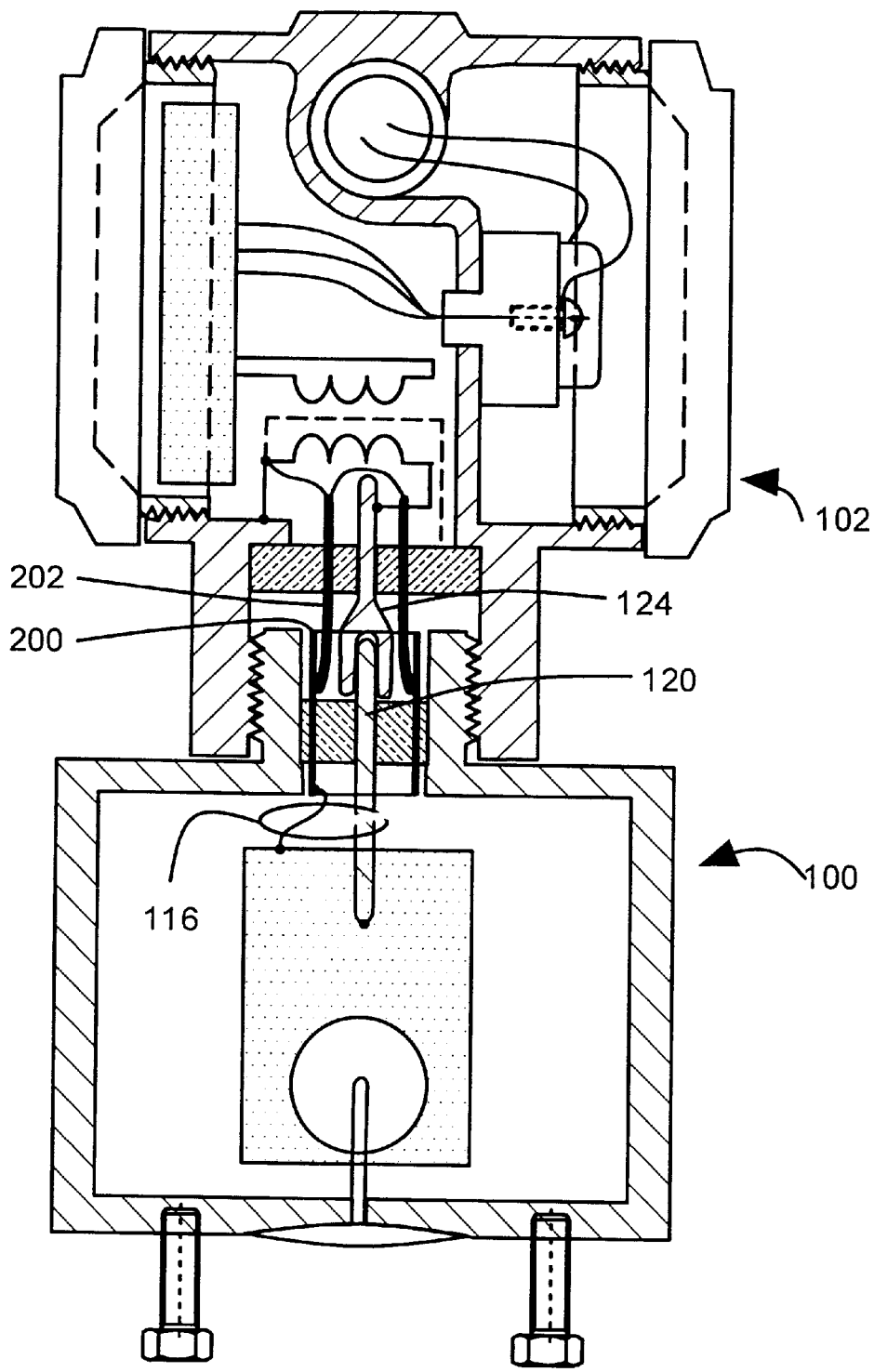
FIGS. 3–5 illustrated embodiments of pressure transmitters with rotatable coaxial electrical contact arrangements.

FIG. 3 illustrates a pressure transmitter with a rotatable coaxial electrical contact arrangement. In FIG. 3, a round, cylindrical sleeve 200 is arranged concentrically around contact 120. Cylindrical sleeve 200 serves as one of the conductors of the two conductor circuit 116. The use of cylindrical sleeve 200 as a contact avoids current flow through the mating threads. In instances where the housing is not used as a conductor for the two conductor circuit, the housings can be made of plastic resin. Cylindrical sleeve 200 slidingly engages a corresponding contact sleeve 202 on the bus adapter module 202. Contact sleeve 202 is cylindrical and concentrically arranged around contact 124.

Figure 4:
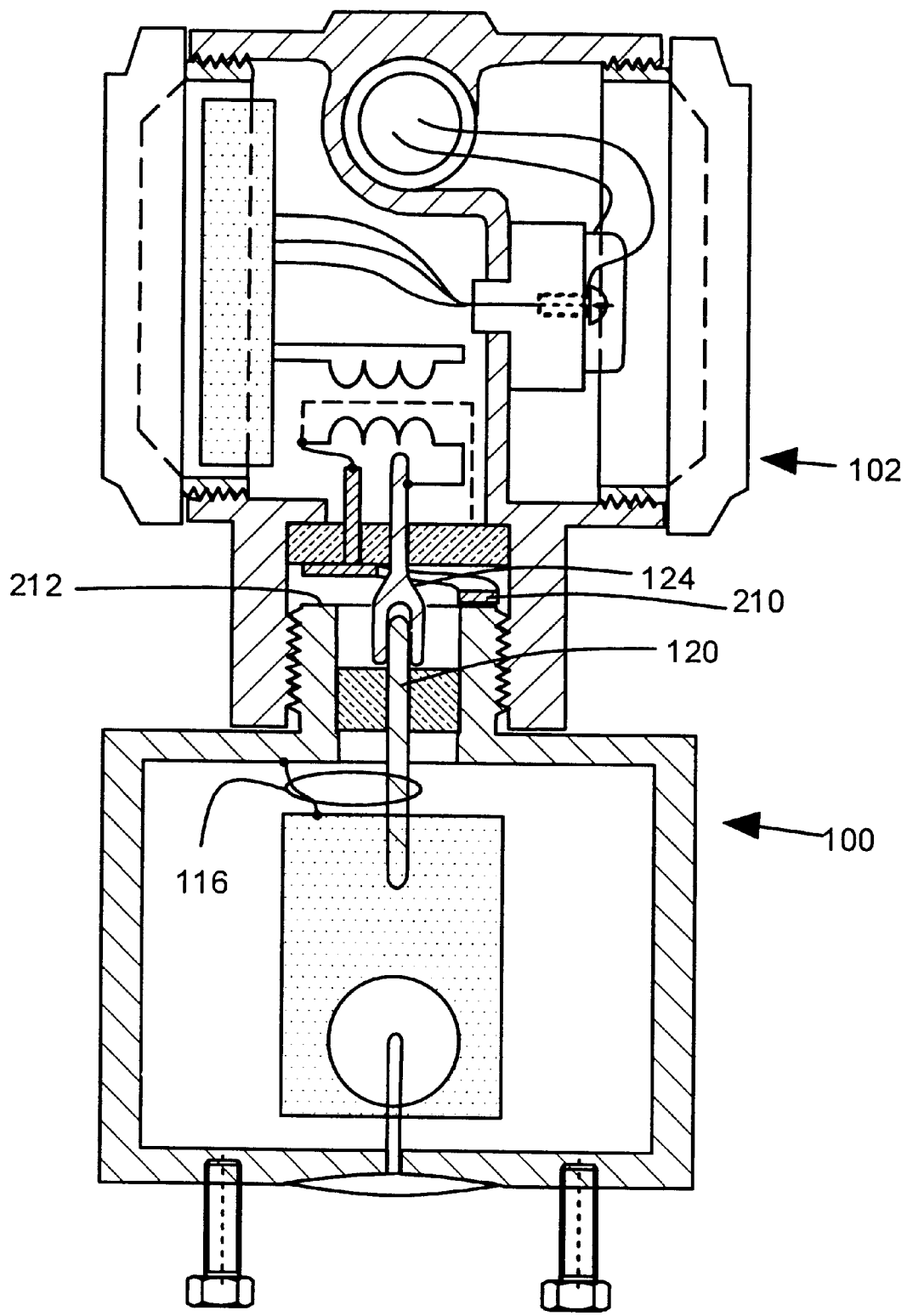

FIG. 4 illustrates a pressure transmitter with a rotatable coaxial electrical contact arrangement. In FIG. 4, a semicircular spring clip 210 serves as a contact for the bus adapter module 102. The top edge 212 of the sensor module 100 serves as a rotationally sliding mating contact with the spring clip 210. This arrangement also avoids current in the two conductor circuit 116 from flowing through the threads.

Figure 5:
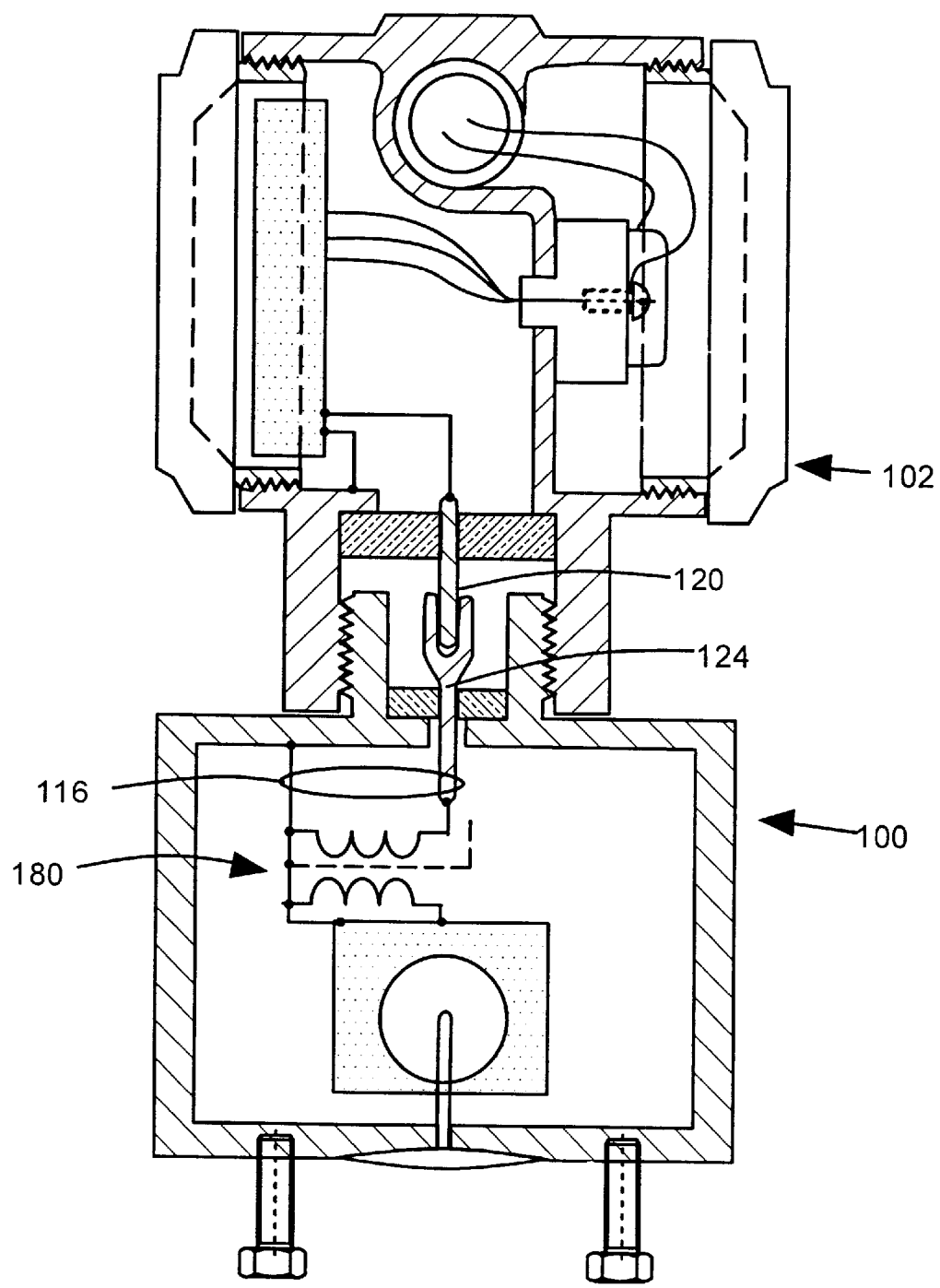

FIG. 5 illustrates a pressure transmitter with a rotatable coaxial electrical contact arrangement. In FIG. 5, isolation transformer 180 is placed in the sensor module 100 rather than the bus adapter module 102. Also in FIG. 5, a pin or contact 120 is sealed in bus adapter module 102 while a slotted outer contact 24 is sealed in a pressure sensor housing 104. In other respects, the embodiment shown in FIG. 5 is similar to the embodiment shown in FIGS. 1–2.

Figure 6:
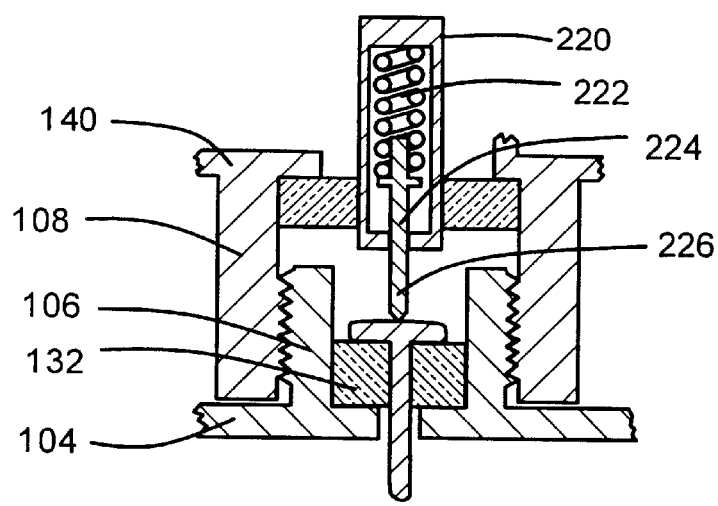
FIGS. 6–8 illustrate embodiments of rotatable coaxial electrical contact arrangements.
Figure 7:
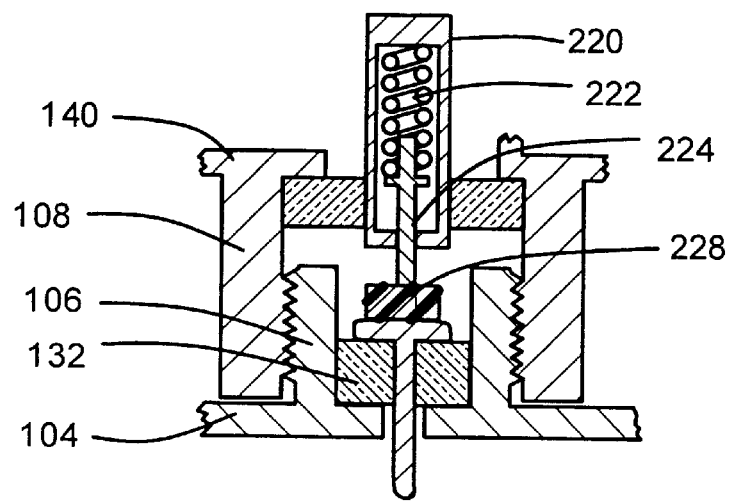
Figure 8:
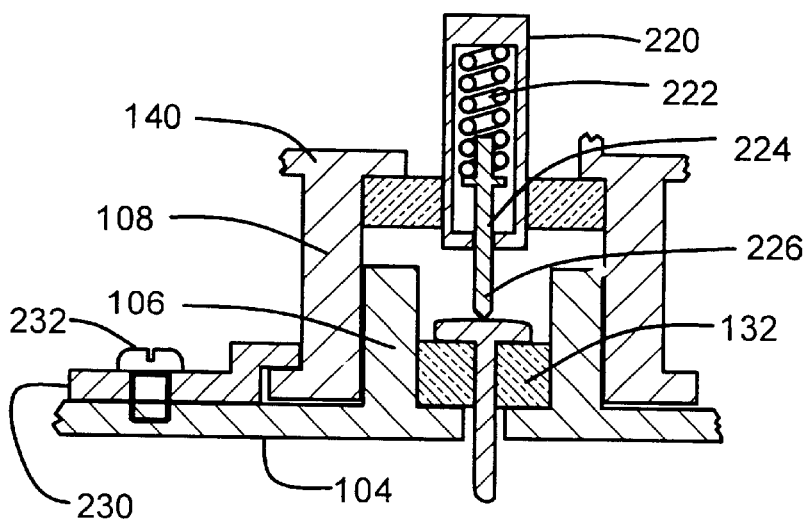

FIGS. 6–8 illustrate further embodiments of rotatable coaxial electrical contact arrangements including a spring loaded metal pin 224 which serves as a contact for the bus adapter module. Spring 222 provides a bias or contact force on pin 224. A metal cylinder 220 has a closed end that retains the spring 222 and also completes the seal of the bus adapter housing 140. In FIG. 6, contact is made with a sharp point 226. In FIG. 7, contact is made with a block of conductive rubber 228. In FIG. 8, the first and second fittings 106, 108 are not threaded. Instead of threads, a clamp 230 and a retaining screw 232 are used to hold the housings 140, 104 together while still allowing them to rotate relative to one another.

FIG. 9 illustrates an exploded view of a pressure transmitter 300 with a rotatable coaxial electrical contact arrangement 302. In FIG. 9, a pressure sensor module 304 senses a differential process pressure (P1–P2) at 305. Pressure sensor module 304 includes a central rotatable electrical contact 306 and an externally threaded surface 303 which also serves as an electrical contact. Contacts 303, 306 are connected to a two conductor circuit in sensor module 304 which energizes low power integrated circuitry in sensor module 304. A bus adapter circuit 312 includes an internally threaded hole 310 which serves as an electrical contact that mates with contact 303 when the pressure transmitter 300 is assembled. Bus adapter circuit 312 also includes a central contact 312 that is spring loaded and mates with contact 306. The spring loading can be similar to that illustrated in FIG. 7. Bus adapter circuit 312 is in a metal housing that includes an externally threaded shaft 316 with an electrical bus connector 314 at its end.

In applications in which an enclosure is not required for electrical bus connections, a field bus can be plugged directly into connector 314. In applications in which an enclosure is required for electrical bus connections, a wiring enclosure 320 can be added. Wiring enclosure 320 has internal threads 318 that mate with external threads 316. Wiring enclosure 320 has a conduit entry 322 that can be conveniently rotated relative to the sensor module 304. This rotation allow the conduit entry 322 to be aligned with a field wiring conduit that carries electrical bus wiring for the transmitter 300.

FIG. 10 illustrates circuit paths associated with the pressure transmitter of FIG. 9. The outer housing of the sensor module 304 is mounted on and grounded to process piping as illustrated at ground 336. The field wiring circuit 152 is grounded at a location that is remote from the process ground, typically a ground 334 at control system 332. The grounds 334, 336 are spaced apart from one another and stray ground current generates a noise potential EN between grounds 334, 336. Transformer 180 includes a galvanic isolation barrier 330 which blocks the flow of ground currents through the sensitive integrated circuitry 110 in pressure sensor module 304. Transformer 330 thus breaks a ground loop through the sensitive integrated circuitry 110. Ground currents, if any, flow through the housings along paths 338, 340.

Figure 11:
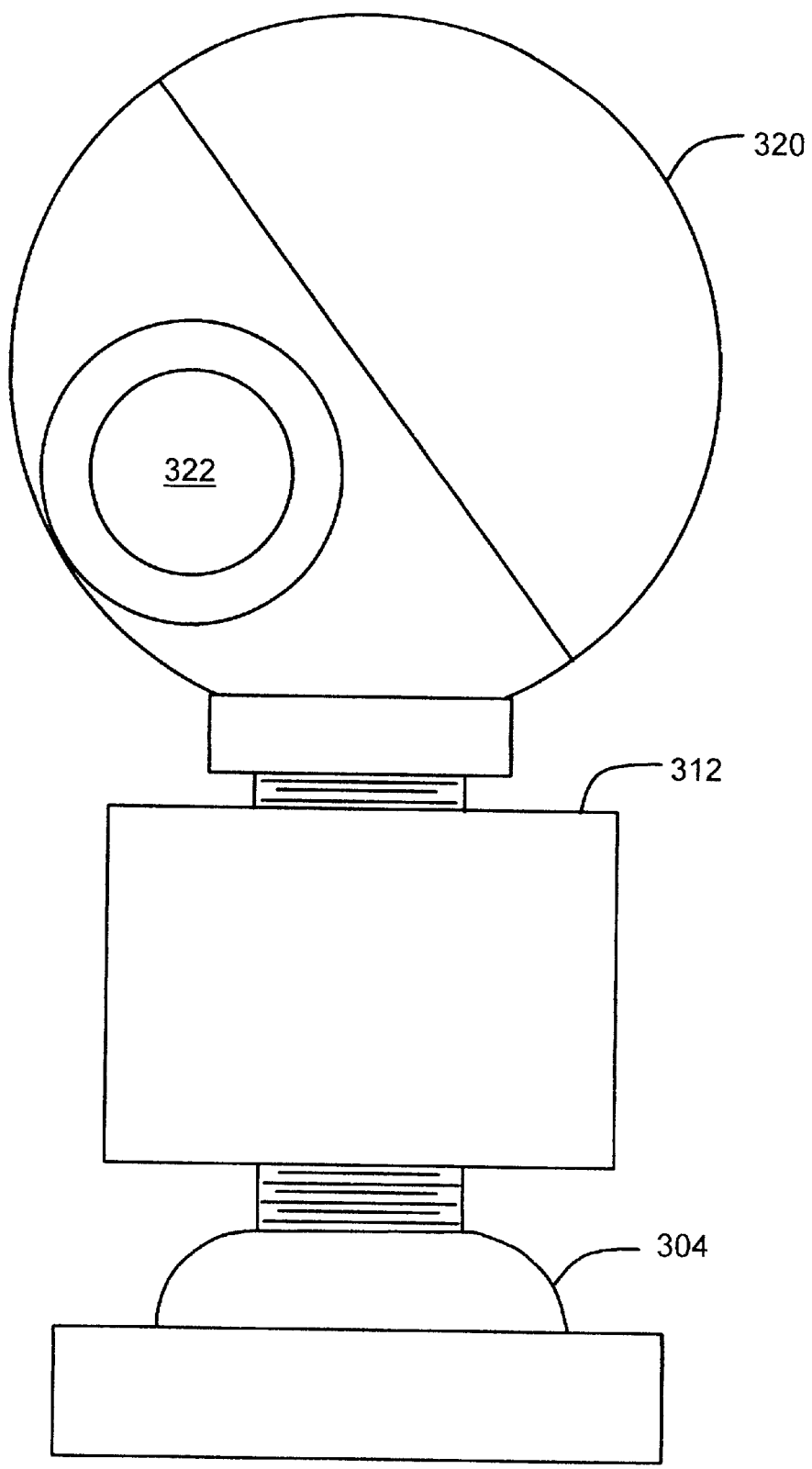
FIG. 11 illustrates an assembled view of the pressure transmitter of FIG. 9.
Figure 12:
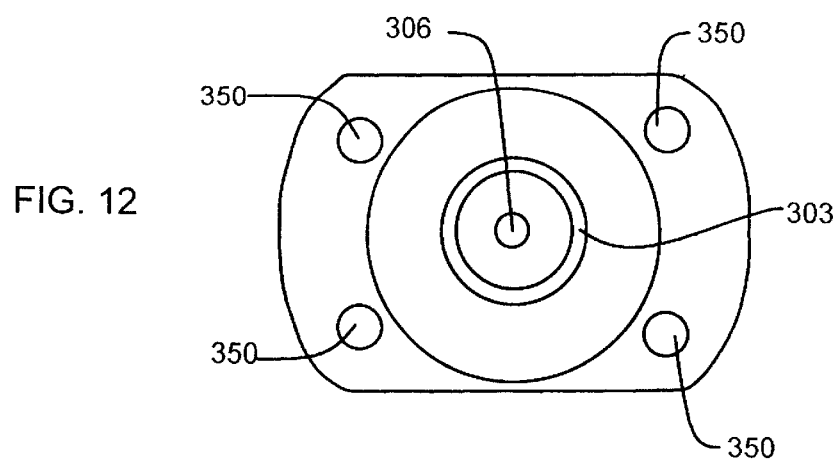
FIGS. 12–15 illustrate the pressure sensor module of FIG. 9 in more detail.
Figure 13:
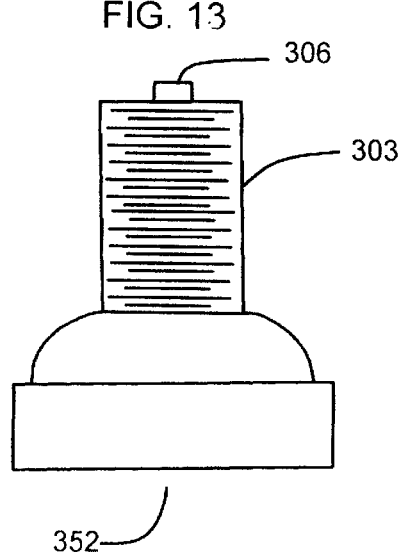
Figure 14:
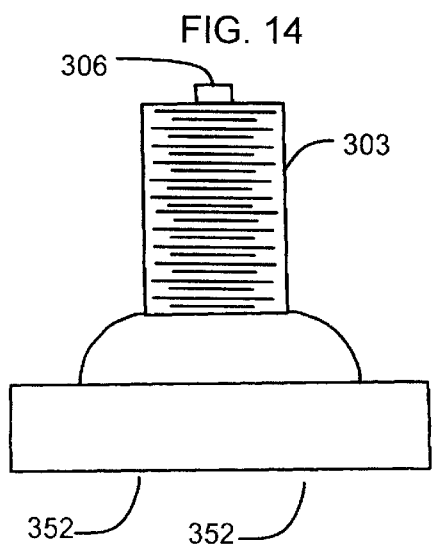

FIG. 11 illustrates an assembled view of the pressure transmitter of FIG. 9.

FIGS. 12–15 illustrate one embodiment of the pressure sensor module 304 of FIGS. 9–11 in more detail. Pressure sensor module 304 includes threaded bolt holes 350 for receiving mounting bolts that mount pressure sensor module 304 to process pressure piping. Isolators 352, which can be of conventional design, receive pressurized process fluids. In other respects, pressure sensor module 304 is arranged generally along the lines of pressure sensor module 100 illustrated in FIG. 1.

Figure 16:
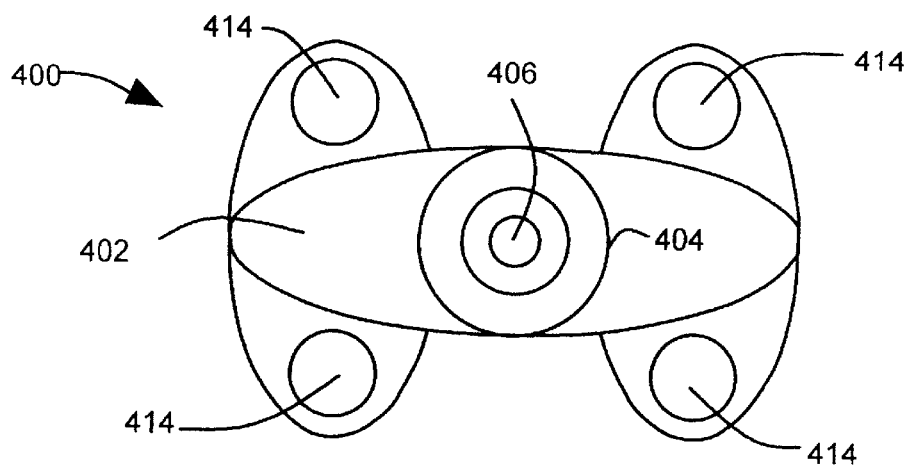
FIGS. 16–18 illustrate an alternative embodiment of a pressure sensor module.
Figure 17:
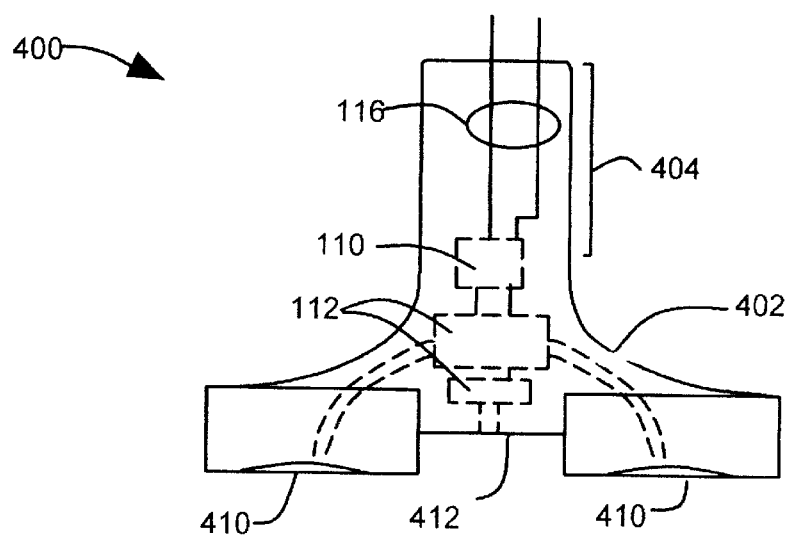
Figure 18:
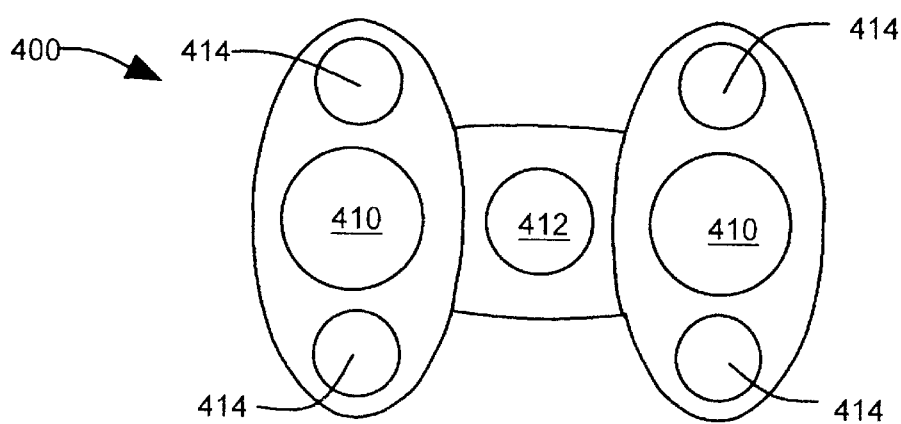

FIGS. 16–18 illustrate an alternative embodiment of a pressure sensor module 400. Pressure sensor module 400 includes a housing 402 that has a threaded portion 404 arranged coaxially around an electrical contact 406. The housing 402 and the electrical contact 406 are connected to a two conductor circuit 116 that couples to integrated circuitry 110 that includes one or more pressure sensors 112. Pressure sensor module 400 includes a pressure sensor 112 coupled to isolator diaphragms 410 which receive differential process pressure from pressurized process fluids. Pressure sensor module 400 also includes a pressure sensor 112 coupled via an isolator 412 for sensing atmospheric pressure. Pressure sensor 400 includes unthreaded bolt holes 414 for receiving bolts (and also nuts) for mounting the pressure sensor module 400 to process piping. In other respects, pressure sensor module 400 is arranged generally along the lines of pressure sensor module 100 illustrated in FIG. 1.

Figure 19:
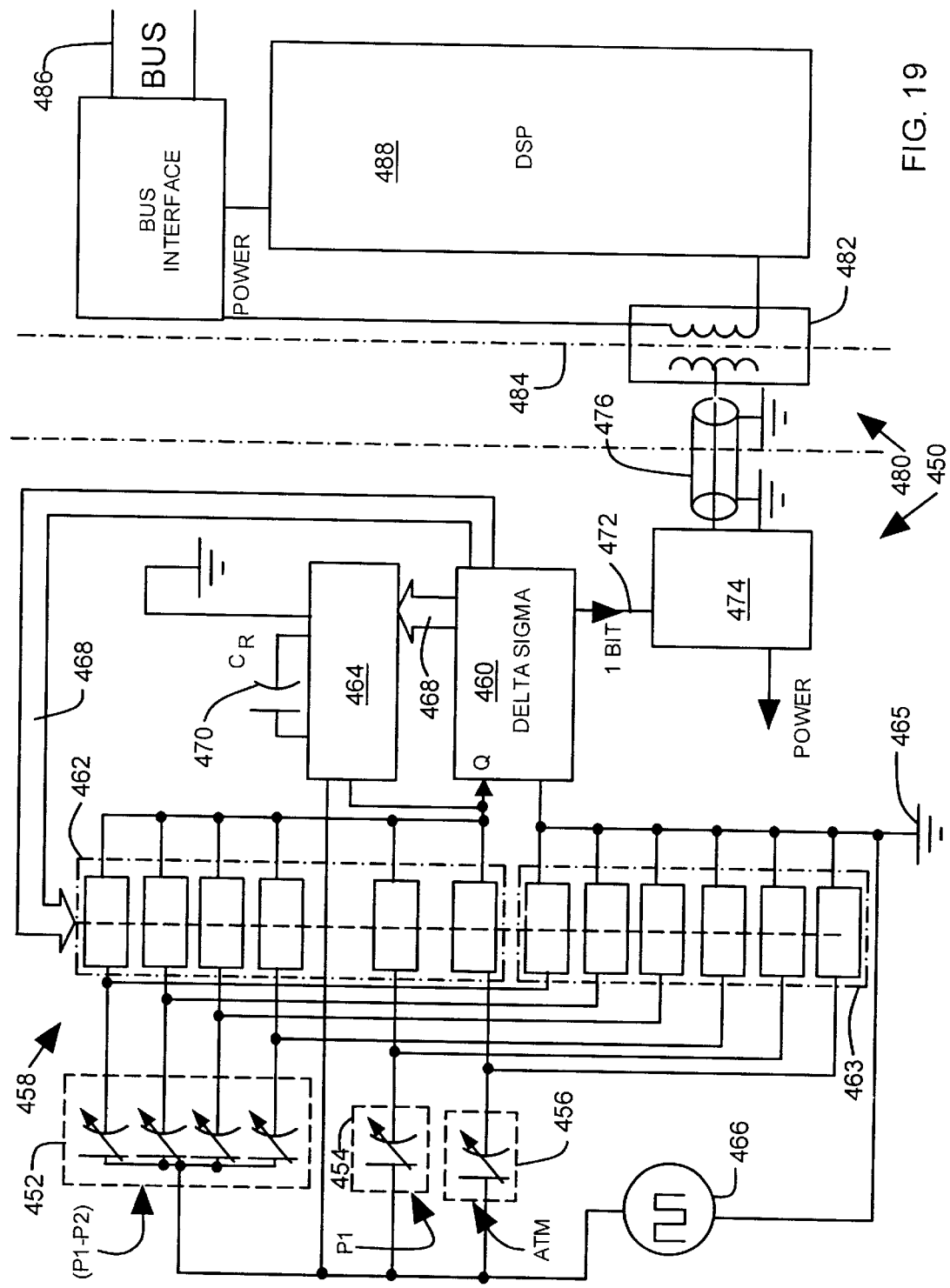
FIG. 19 illustrates details of integrated circuitry in a pressure sensor module.

FIG. 19 illustrates one example of details of low power circuitry 450 in a pressure sensor module. Circuitry 450 includes capacitive pressure sensors 452, 454, 456 and low power integrated circuitry 458.

Figure 15:
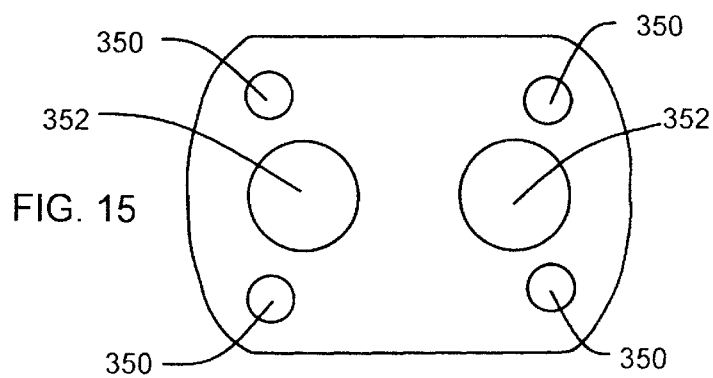

Capacitive pressure sensor 452 senses differential pressure between two pressure inlets such as isolators 352 illustrated in FIG. 15. Capacitive pressure sensor 452 can be a dual plate capacitive sensor without or with additional plates for compensation as described in application Ser. No. 09/312,411 filed May 14, 1999 and entitled "PROCESS PRESSURE MEASUREMENT DEVICES WITH IMPROVED ERROR COMPENSATION," which is hereby incorporated herein by reference.

In one embodiment, the pressure sensor module preferably includes a capacitive pressure sensor 454 which is an absolute pressure sensor that is connected to one of the two isolators 352. Sensor 454 provides sensing of line pressure, which can be used to compensate differential pressure readings for errors due to line pressure in some applications.

Capacitive pressure sensor 456 is an absolute pressure sensor. Sensor 456 senses atmospheric pressure near the sensor module, which can be used to provide compensation for atmospheric pressure in some tank level applications, for example.

The low power circuitry 450 includes a delta sigma converter 460, switches 462, 463, 464, an excitation source 466 and a reference capacitor 470. Sigma delta converter 460 includes a control bus 468 that controls the actuation of switches 462, 463, 464 in synchronization with excitation source 466.

During the operation of the delta sigma circuit 460, a selected one of the sensing capacitors (a sensing capacitor in one of the sensors 452, 454, 456) is connected to ground 465 by a selected one of the switches 463 and charged to the excitation potential by excitation source 466. Then, the selected capacitor is fully discharged into the charge input Q of the delta sigma converter 460 through a selected one of the switches 462. This charging and discharging is repeated for each of the sensing capacitors. This charging and discharging is also repeated at selected intervals for the reference capacitor 470 in order to periodically rezero the charge accumulated at the charge input Q of the delta sigma converter 460. The delta sigma converter 460 measures charge from the sensing capacitors and the reference capacitor 470 and calculates a 1 bit serial output 472 that represents the pressures that are sensed by sensors 452, 454, 456.

An interface circuit 474 receives the one bit output 472 and serially communicates data representing the pressures along a two conductor circuit 476 to a bus adapter module 480. Bus adapter module 480 includes a transformer 482 that preferably provides a galvanic isolation barrier 484 between the field bus 486 and the sensor module circuitry 450.

Interface circuit 474 also receives low power energization from the transformer 482 and distributes power to all of the sensor module circuitry 450.

Interface circuit 474 also receives communication signals from the bus interface circuitry 480 via the two conductor circuit 476 and adjusts the operation of the sensor module circuitry 450 according to the communications received from bus adapter circuitry 480.

Although the present invention has been described with reference to preferred embodiments, workers skilled in the art will recognize that changes may be made in form and detail without departing from the spirit and scope of the invention.

What is claimed is:

1. A process sensor module, comprising:
   a housing including a first fitting adapted to rotatably mate with a second fitting on a bus adapter module;
   integrated circuitry disposed in the housing, the integrated circuitry including a process sensor adapted to sense a process variable;
   a two conductor circuit connected to the integrated circuitry, and adapted to energize the integrated circuitry;
   communicate the sensed process variable to the bus adapter module; and
   communicate data from the bus adapter module to the integrated circuitry; and
   a rotatable coaxial electrical contact that is sealed in the first fitting and that is adapted to connect the two conductor circuit to the bus adapter module.

2. The process sensor module of claim 1 wherein the two conductor circuit and the rotatable coaxial electrical contact provide noise isolation for the integrated circuitry.

3. The process sensor module of claim 1 wherein the integrated circuitry includes integrated circuits that operate with supply voltage levels of less than 10 volts.

4. A process transmitter including the process sensor module of claim 1 and further comprising:
   the bus adapter module including a second coaxial electrical contact arrangement disposed in the second fitting and rotatably mating with the first coaxial electrical contact arrangement.

5. The process transmitter of claim 4 wherein the first fitting includes first threads and the second fittings includes second threads that mate with the first threads.

6. The process transmitter of claim 5 wherein the first and second coaxial electrical contacts are automatically mated when the first and second fittings are mated.

7. The process transmitter of claim 6 wherein the first and second coaxial electrical contacts are mated over a rotation range of at least 720° degrees of rotation of the second fitting on the first fitting.

8. The process transmitter of claim 6 wherein the first and second coaxial electrical contacts slidingly engage one another.

9. The process transmitter of claim 6 wherein at least one of the first and second electrical contacts is spring loaded.

10. The process transmitter of claim 4 wherein the housing is adapted for rigid mounting to a process vessel, and wherein rotating the second threaded fitting relative to the first threaded fitting rotationally varies a position of a conduit hub on the bus adapter module.

11. The process transmitter of claim 4 wherein the bus adapter module includes:
   a transformer having a first winding coupled to the two conductor circuit and a second winding coupled to a communication bus; the transformer including a galvanic isolation barrier between first winding and the second winding.

12. The process transmitter of claim 1 wherein the rotatable coaxial electrical contact arrangement includes a spring loaded pin.

13. The process transmitter of claim 1 wherein the integrated circuitry comprises a delta sigma converter.

14. The process transmitter of claim 1 wherein the process sensor is a pressure sensor.

15. The process transmitter of claim 1 wherein the housing of the process sensor module is grounded.

16. The process transmitter of claim 1 wherein the housing of the process sensor is electrically connected to one conductor of the two conductor circuit.

17. The process transmitter of claim 16 wherein the housing of the process sensor is grounded.

* * * * *

UNITED STATES PATENT AND TRADEMARK OFFICE
CERTIFICATE OF CORRECTION

PATENT NO.    : 6,508,131 B2
DATED         : January 21, 2003
INVENTOR(S)   : Frick It is certified that error appears in the above-identified patent and that said Letters Patent is hereby corrected as shown below:

<u>Title page,</u>
Item [56], References Cited, U.S. PATENT DOCUMENTS, add:

| | | | | |
|---|---|---|---|---|
| --2,533,339 | 12/12/50 | Willenborg | 177 | 311 |
| 3,012,432 | 12/12/61 | Moore et al. | 73 | 40 |
| 3,218,863 | 11/23/65 | Calvert | 73 | 398 |
| 3,232,712 | 02/01/66 | Stearns | 23 | 255 |
| 3,249,833 | 05/03/66 | Vosteen | 317 | 246 |
| 3,374,112 | 03/19/68 | Danon | 117 | 226 |
| 3,557,621 | 01/26/71 | Ferran | 73 | 398 |
| 3,697,835 | 10/10/72 | Satori | 317 | 246 |
| 3,808,480 | 04/30/74 | Johnston | 317 | 256 |
| 3,924,219 | 12/02/75 | Braun | 338 | 34 |
| 4,008,619 | 02/22/77 | Alcaide et al. | 73 | 398 |
| 4,158,217 | 06/12/79 | Bell | 361 | 283 |
| 4,168,518 | 09/18/79 | Lee | 361 | 283 |
| 4,177,496 | 12/04/79 | Bell et al. | 361 | 283 |
| 4,227,419 | 10/14/80 | Park | 73 | 724 |
| 4,287,553 | 09/01/81 | Braunlich | 361 | 283 |
| 4,322,775 | 03/30/82 | Delatorre | 361 | 283 |
| 4,336,567 | 06/22/82 | Anastasia | 361 | 283 |
| 4,358,814 | 11/09/82 | Lee et al. | 361 | 283 |
| 4,370,890 | 02/01/83 | Frick | 73 | 718 |
| 4,389,895 | 06/28/83 | Rud, Jr. | 73 | 724 |
| 4,422,125 | 12/20/83 | Antonazzi et al. | 361 | 283-- |

UNITED STATES PATENT AND TRADEMARK OFFICE
CERTIFICATE OF CORRECTION

PATENT NO. : 6,508,131 B2
DATED : January 21, 2003
INVENTOR(S) : Frick

It is certified that error appears in the above-identified patent and that said Letters Patent is hereby corrected as shown below:

<u>Title page cont'd,</u>
Item [56], FOREIGN PATENT DOCUMENTS, add:
-- EP   0 524 550 A1   01/27/93
   DE   3340834 A1    05/23/85
    WO   99/53286       10/21/99 --

Signed and Sealed this

Twenty-second Day of July, 2003

JAMES E. ROGAN
*Director of the United States Patent and Trademark Office*